UNITED STATES PATENT OFFICE.

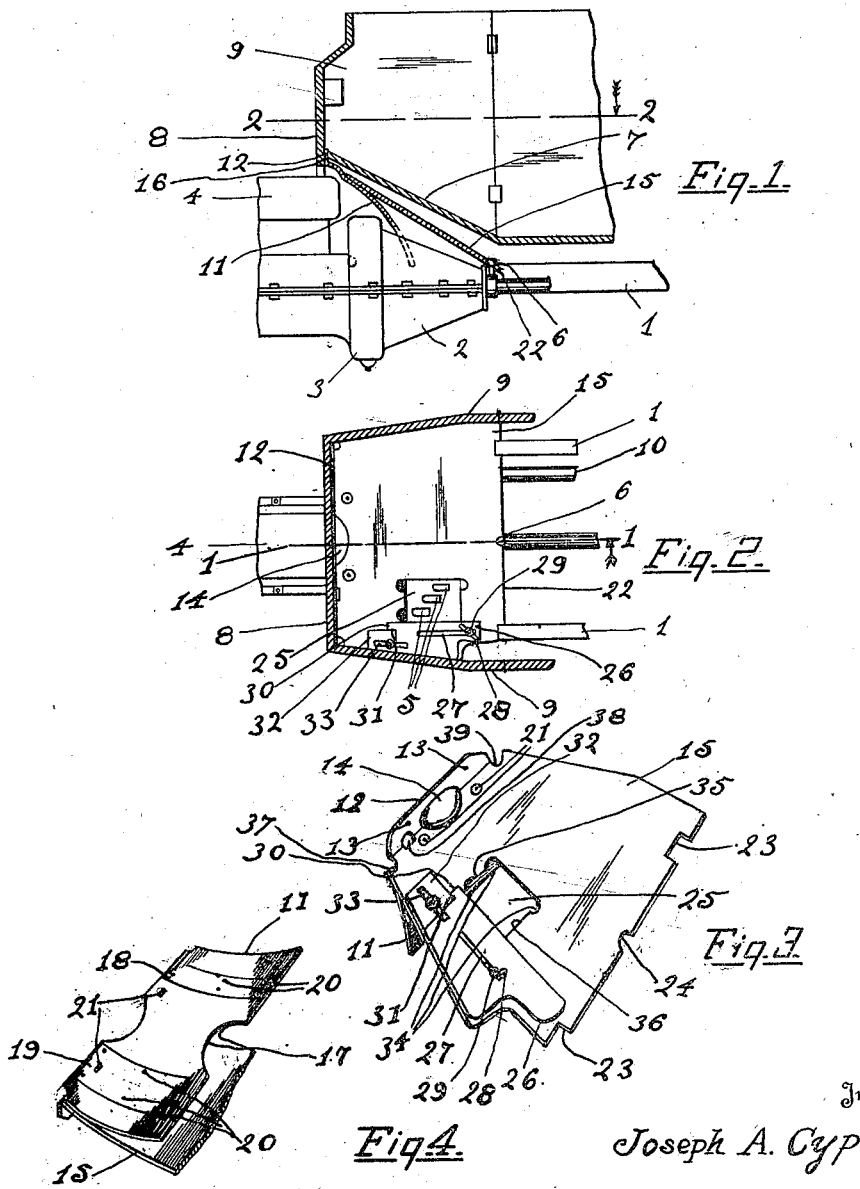
J. A. CYPERT.
HEAT SHIELD FOR AUTOMOBILES.
APPLICATION FILED JUNE 3, 1918.
1,295,858.
Patented Mar. 4, 1919.
Inventor
Joseph A. Cypert

JOSEPH A. CYPERT, OF KANSAS CITY, MISSOURI.

HEAT-SHIELD FOR AUTOMOBILES.

1,295,858.
Specification of Letters Patent.
Patented Mar. 4, 1919.

Application filed June 3, 1918. Serial No. 237,894.

*To all whom it may concern:*

Be it known that I, JOSEPH A. CYPERT, a citizen of the United States, residing at Kansas City, in the county of Jackson and State of Missouri, have invented certain new and useful Improvements in Heat-Shields for Automobiles, of which the following is a full and exact description, such as will enable others skilled in the art to which it appertains to make and use the same.

The invention relates to heat shields for automobiles and has provided certain improvements in the construction of and attachment to automobiles, of the heat shield embodied in Letters Patent of the United States No. 1,258,990, issued to the present applicant March 12, 1918.

In applying the heat shield of the above mentioned patent to automobiles certain improvements in the construction have been found advantageous.

The present invention has provided certain improvements that have in practice been made in the construction of the heat shield embodied in the above described Letters Patent.

With these objects in view the invention consists in the features of construction, combinations and arrangements of parts hereinafter set forth and more particularly pointed out in the appended claims, the accompanying drawings illustrating a form of the improvements.

In the drawings:

Figure 1. is a sectional view of the improved heat shield taken on line 1—1 of Fig. 2 and a fragmentary view of the automobile to which the heat shield is attached.

Fig. 2, is a sectional view taken on line 2—2 of Fig. 1 with the heat shield shown in plan view.

Fig. 3, is a perspective view of the heat shield illustrating the upper side thereof.

Fig. 4, is a fragmentary perspective view of the heat shield illustrating the lower or under side of the shield.

The chassis frame 1, transmission case 2, flywheel case 3, engine 4, operating levers 5, oil cup 6, floor 7, dash 8, body walls 9, and exhaust pipe 10 are of common and well known construction.

The deflecting shield plate 11 is bent to form the upwardly projecting flange 12 which rests against the dash 8 and is provided with the holes 13 for the insertion of ordinary nails or screws when it is desired to secure the deflecting shield to the dash in this manner, it being understood that there are other means of securing the flange 12 as will hereinafter appear.

The deflecting shield plate 11 is provided with the hood 14 preferably integral therewith and presenting an upward convex surface and a downward concaved surface, the hood being for the purpose of providing air circulation room between the shield and the engine 4, it is obvious however that this hood may be formed in the main shield plate 15 or formed separately and attached in any ordinary manner.

The edge 16 of the floor 7 rests against the projecting flange 12 of the deflecting shield plate 11 and serves to hold it rigidly in place even if nails or screws were not inserted in the dash 8 through the holes 13, the deflecting shield projecting rearwardly and downwardly and being provided with the large notch 17 so that it will fit around the transmission case 3 and direct the main current of air from the engine downward at some distance from the floor 7. This shield is preferably of flexible material and provided with the sheet metal plates 18 and 19 secured thereto by the rivets 20 so that the shield including the metal plates may be bent to the desired shape, curved as shown, or to any desired straight angle and the plates will retain the shield in the position to which they are bent, the shield usually being straight when shipped to save room in packing.

The main shield plate 15 is secured to the deflecting shield 11 by the split pins or rivets 21 it being understood that the manner of securing the shields together may be varied and that other ordinary means may be employed without invention. This main shield plate 15 rests snugly against the flange 12 and around the hood 14 and is spread across between and fills transversely between between the body wall 9, the rear end 22 of the shield plate resting upon the chassis frame 1, the notches 23 being formed as shown so that the shield will fit over and around the chassis frame.

The notch 24 is provided to fit around the oil cup 6 and the large notch 25 is provided for space for the operating levers 5 so that when the cover plate 26 is removed from the notch the shield plates 11 and 15 may be placed between the walls 9 of the automobile as shown, it being understood that the floor 7 is removed before placing the shield and replaced after the shield is placed.

The cover plate 26 is provided with the slot 27 so that it may be removed from the notch 25 without removing the thumb nut 28, by sliding the plate rearwardly, the nut and the bolt 29 securing the cover plate rigidly in place after the shield is placed between the walls 9.

As a means of further securing the cover plate 26 the projecting lug 30 is provided integral with the plate, the side 31 of the lug resting against the stop plate 32 which is rigid with the main shield plate 15, the button clamp 33 is also provided on the stop plate and turned to the position shown in Figs. 2 and 3 to further secure the plate 26 by clamping it to the main shield plate 15.

The notches 34 are provided in the main shield plate 15 so as to allow room for the operating levers 5 to be operated, and the walls 35 and 36 of the notch 25 to be closer together than would otherwise be necessary. No means for closing the notch 25 around the levers 5 is shown in the present drawings as this feature is covered in my former Letters Patent hereinbefore referred to.

The notch 37 is provided for the usual wires connecting the usual horn with the usual steering wheel switch. The hole 38 is provided as a rest and retaining means for the usual horn.

The notch 39 is provided for the usual speedometer shaft, these parts not being shown because of common and well known construction.

It will be noticed that the plate 19 on the deflective shield plate 11 is of considerable width, the purpose being to protect the deflecting shield plate from the heat radiating from the exhaust pipe 10, this plate being positioned over the exhaust pipe when the shield is placed in the automobile as shown in Figs. 1 and 2.

The present invention has provided the deflecting shield plate 11 to direct the air downward, the flange 12 fitting between the dash 8 and the floor 7, to more easily secure the shield in place, the end 22 of the main heat shield extended downwardly and rearwardly and resting on the chassis frame to more securely support the shield, the notches 23 fitting around the chassis frame, the lug 30 and stop plate 32 to more securely fasten the cover plate 26 to the main shield plate 15, the notch 24 to fit around the oil cup 6, the notches 34 so that the notch 25 may be smaller, the metal plates 18 and 19 to retain the shield plate 11 in any desired degree of deflection, the plate 19 formed wide and positioned over the exhaust pipe 10 to protect the shield plate 11 from heat radiating from the exhaust pipe, the notch 37 for the horn connecting wires, the hole 38 to retain the horn, and the notch 39 for the speedometer shaft.

The appended claims are not intended to claim any element or elements of the former Letters Patent hereinbefore referred to excepting in combination with the improved features embodied in the claims.

What I claim as new, and desire to secure by Letters Patent, is:—

1. In a heat shield for automobiles, a deflecting plate provided with a flange resting between the dash and the floor of an automobile, said deflecting plate extending rearwardly and downwardly and fitting around the transmission case, a curved hood formed in said shield with a concaved side facing the engine and a convex side adjacent the floor, a flat plate resting against said flange and extending rearwardly and downwardly, the rear end of said flat plate resting on the chassis frame, and a hole in said flat plate for the operating levers.

2. In a heat shield for automobiles, a deflecting plate provided with a flange arranged to rest between the dash and floor of an automobile, a flat plate resting against said flange, the opposite end of said flat plate arranged to rest upon the chassis frame, a curved hood in said deflecting plate adjacent said flange, and said deflecting plate extended along said flat plate and declining therefrom.

3. In shields for automobiles, a deflecting plate arranged for connection to the dash of an automobile, a flat plate projecting rearwardly from said deflecting plate, the rear end of said flat plate arranged to rest upon the chassis frame, and a hole in said flat plate to receive the operating levers.

4. In shields for automobiles, a deflecting plate arranged for connection to the dash of an automobile, a flat plate projecting rearwardly from said deflecting plate, the rear end of said flat plate arranged to rest upon the chassis frame, notches in the rear end of said flat plate to fit around the chassis frame, and a hole in said flat plate to receive the operating levers.

5. In a heat shield for automobiles, a deflecting plate arranged for connection to the dash of an automobile, a flat plate projecting rearwardly from said deflecting plate, the rear end of said flat plate arranged to rest upon the chassis frame, a notch in the rear end of said flat plate to fit around the oil cup of the transmission case, and a hole in said flat plate to receive the operating levers.

6. In a heat shield for automobiles, a deflecting plate arranged for connection to the dash of an automobile, a flat plate projecting rearwardly from said deflecting plate, the rear end of said flat plate arranged to rest upon the chassis frame, a notch in the dash connecting end of said plate to receive the usual wires connecting the horn and the steering wheel switch, and a hole in said flat plate to receive the operating levers.

7. In a heat shield for automobiles, a deflecting plate arranged for connection to the dash of an automobile, a flat plate projecting rearwardly from said deflecting plate, the rear end of said flat plate arranged to rest upon the chassis frame, a hole in the dash connecting end of said plates to receive the usual horn, and a hole in said flat plate to receive the operating levers.

8. In a heat shield for automobiles, a deflecting plate arranged for connection to the dash of an automobile, a flat plate projecting rearwardly from said deflecting plate, the rear end of said flat plate arranged to rest upon the chassis frame, a notch in the dash connecting end of said plate to receive the usual speedometer shaft, and a hole in said flat plate to receive the operating levers.

9. In a heat shield for automobiles, a flat plate with one end thereof attachable by suitable connections to the dash of an automobile, the opposite end of said flat plate arranged to rest upon the chassis frame, a hole in said flat plate to receive the operating levers, said hole slotted and opening to one side of said plate, a cover plate covering said hole from the place occupied by the levers to the adjacent outer edge thereof, a lug on one end of said cover plate, a stop plate for the engagement of said lug, said stop plate rigid with said flat plate, and a clamp button on said stop plate to clamp said cover plate.

10. In a heat shield for automobiles, a flat plate reaching from the dash over the transmission case to the chassis frame, said flat plate provided with a semicircular notch approximately centrally located in the dash connecting end of the plate, and a hood presenting a convex upper surface and a concaved lower surface and filling said notch and forming connection with the dash.

11. In a heat shield for automobiles, a shield reaching rearwardly and downwardly from the dash, and a curved hood in said shield adjacent the dash.

JOSEPH A. CYPERT.